United States Patent Office 2,992,244
Patented July 11, 1961

2,992,244
2α-METHYL-9α-FLUORO-11β-17α-DIHYDROXY-4-PREGNENE-3,20-DIONE 17-ACYLATES
John A. Hogg, Charleston Township, Kalamazoo County, Frank H. Lincoln, Kalamazoo, and William P. Schneider, Kalamazoo Township, Kalamazoo County, Mich., assignors to The Upjohn Company, Kalamazoo, Mich., a corporation of Delaware
No Drawing. Filed Dec. 14, 1959, Ser. No. 859,097
2 Claims. (Cl. 260—397.45)

This invention relates to novel steroid esters and more particularly to 2α-methyl-9α-fluoro-11β,17α-dihydroxy-4-pregnene-3,20-dione 17-acylates and to a process for the preparation thereof.

The novel 2α-methyl-9α-fluoro-11β,17α-dihydroxy-4-pregnene-3,20-dione 17-acylates of this invention are highly active oral progestational agents with accompanying high degree of anti-inflammatory activity. Another advantage of the compounds of this invention is their very low mineralocorticoid activity.

The novel compounds of this invention can be prepared and administered to birds and mammals (including humans) in a wide variety of oral or parenteral dosage forms singly, or in admixture with other coacting compounds. They can be associated with a pharmaceutical carrier which can be a solid material or a liquid in which the compound is dissolved, dispersed or suspended. The solid compositions can take the form of tablets, powders, capsules, pills or the like, preferably in unit dosage forms for simple administration or precise dosages. The liquid compositions can take the form of solutions, emulsions, suspensions, syrups or elixirs. The novel compounds can also be administered topically in the form of ointments, creams, lotions, and the like, with or without coacting antibiotics, germicides or other materials forming advantageous compositions therewith.

Ten thousand tablets for oral use, each containing 5 mg. of steroid are prepared from the following types and amounts of material:

2α - methyl - 9α - fluoro - 11β,17α - dihydroxy - 4-pregnene-3,20-dione 17-acetate _____ g__ 50
Lactose U.S.P. _____ g__ 2,250

The finely powdered steroid and lactose are mixed well and granulated with syrup-starch paste. Starch and calcium stearate are used as lubricants in the compressing step.

The oral administration of 1 tablet daily is useful in the treatment of severe functional uterine bleeding in humans.

The process of this invention comprises: epoxidation of 2α-methyl-9α-bromo-11β,17α-dihydroxy-4-pregnene-3,20-dione 17-acylate to give the corresponding 2α-methyl-17α-hydroxy-9β,11β-epoxy-4-pregnene-3,20-dione 17-acylate and fluorination of the 9,11-epoxy compound thus obtained with a source of hydrogen fluoride to give the corresponding 2α - methyl - 9α - fluoro-11β,17α-dihydroxy-4-pregnene-3,20-dione 17-acylate.

The novel compounds of this invention and the process for their preparation are illustratively represented by the following reaction scheme:

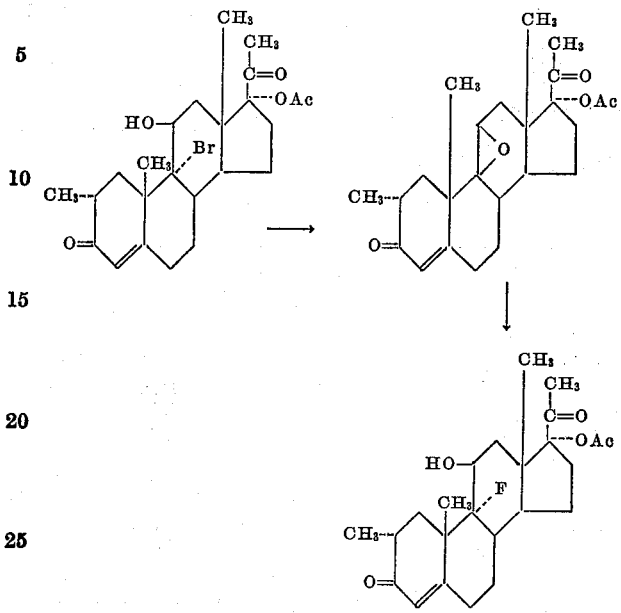

wherein Ac is the acyl radical of an organic carboxylic acid, preferably a hydrocarbon carboxylic acid containing from 1 to 12 carbon atoms, inclusive.

The starting steroids for the compounds and process of this invention are 2α-methyl-9α-bromo-11β,17α-dihydroxy-4-pregnene-3,20-dione 17-acylates which are prepared in accordance with the procedures of Preparations 1 through 3 containing therein. The starting material for Preparation 1 is prepared in accordance with the preparations and examples of U.S. Patent 2,865,935, particularly Example 5, to give 2α-methyl-11β,17α-dihydroxy-4-pregnene-3,20-dione.

In carrying out the process of this invention, the 2α-methyl - 9α - bromo - 11β,17α - dihydroxy - 4 - pregnene-3,20-dione 17-acylates are converted to the respective 2α-methyl - 9α - fluoro - 11β,17α - dihydroxy - 4 - pregnene-3,20-dione 17-acylates in accordance with methods well known in the art, e.g., U.S. Patent 2,852,511 or U.S. Patent 2,838,498. The selected 2α-methyl-9α-bromo-11β,17α-dihydroxy-4-pregnene-3,20-dione 17-acylate is epoxidized with a mild base, potassium acetate is preferred, to give the corresponding 2α-methyl-9β,11β-epoxy-4-pregnene-3,20-dione 17-acylate. The selected 9,11-epoxy compound thus obtained is then fluorinated with a source of hydrogen fluoride to give the corresponding 2α-methyl-9α-fluoro - 11β,17α - dihydroxy - 4 - pregnene-3,20-dione 17-acylate.

The following preparations and examples are illustrative of the process and products of this invention.

PREPARATION 1

*2α-methyl-17α-hydroxy-4,9(11)-pregnadiene-3,20-dione*

A solution containing 3.60 g. of 2α-methyl-11β,17α-dihydroxy-4-pregnene-3,20-dione in 30 ml. of pyridine at 25° C. was treated with 2.21 g. of N-bromoacetamide. After 20 minutes the solution was cooled and an excess of anhydrous sulfur dioxide was added with stirring. The reaction mixture was kept at about 25° C. for a period of 30 minutes and then cooled. 100 ml. of water was then added with stirring to the cooled reaction mixture and the cooling was continued for several hours keeping the temperature at 5° C. The precipitate thus obtained was collected on a filter, washed with water and dried under vacuum at 70° C. to give 2.9 g. of 2α-methyl-17α-hydroxy-4,9(11)-pregnadiene-3,20-dione. The crude product thus obtained was dissolved in a mixture of 50 ml. of methylene chloride and 25 ml. of Skellysolve B hexanes and chromatographed on a column containing 150 g. of Florisil synthetic magnesium silicate. The column was eluted with 160 ml. fractions of 8 percent acetone in Skellysolve B hexanes. Fractions 3–13 were combined to give 1.52 g. of product, which on recrystallization from acetone:Skellysolve B hexanes gave 0.93 g. of 2α-methyl-17α-hydroxy-4,9(11)-pregnadiene-3,20-dione melting at 229–231° C., $[\alpha]_D^{26}+92$ (chloroform).

Analysis.—Calcd. for $C_{22}H_{30}O_3$: C, 77.15; H, 8.83. Found: C, 77.85; H, 8.79.

PREPARATION 2

2α-methyl-17α-hydroxy-4,9(11)-pregnadiene-3,20-dione 17-acetate

A mixture was prepared containing 1.0 g. of 2α-methyl-17α-hydroxy-4,9(11)-pregnadiene-3,20-dione, 20 ml. of acetic acid, 5 ml. of acetic anhydride and 0.4 g. of p-toluenesulfonic acid monohydrate. The mixture was stirred until a clear solution was obtained. The reaction mixture was allowed to stand for an additional period of several hours and was then poured into 96 ml. of water. The aqueous mixture was chilled at 5° C. until a precipitate was obtained. The precipitate was collected on a filter and washed with cold water. The precipitate was then dissolved in 15 ml. of methylene chloride, washed with water, dried over sodium sulfate, and concentrated to about 5 ml. Methanol (10 ml.) was then added and the solution was concentrated to 9 ml. The concentrated solution was then treated with 0.15 ml. of 10 percent aqueous sodium hydroxide solution. After cooling, the formed crystals were collected on a filter to give 0.71 g. of 2α-methyl-17α-hydroxy-4,9(11)-pregnadiene-3,20-dione 17-acetate melting at 241–243° C. Recrystallization from methanol gave 0.65 g. of 2α-methyl-17α-hydroxy-4,9(11)-pregnadiene-3,20-dione 17-acetate melting at 241–244° C., $[\alpha]_D^{26}+75°$ (chloroform);

$\nu_{max}^{mineral\ oil}$ 1727, 1675, 1640 and 1618 cm.$^{-1}$

In the same manner substituting the anhydride of another hydrocarbon carboxylic acid, e.g., an aliphatic acid, e.g., acetic, propionic, butyric, valeric, hexanoic, lauric, trimethylacetic, isobutyric, isovaleric, tertiary butylacetic, or formic acid (in the presence of acetic anhydride), a cycloaliphatic acid, e.g., β-cyclopentylpropionic, cyclohexanoecarboxylic, cyclohexylacetic, an alkaryl acid, e.g., benzoic, phenylacetic, β-phenylpropionic, o-, m-, p-toluic, a saturated dibasic acid (which can be converted into water soluble, e.g., sodium, salts), e.g., succinic, adipic, a monobasic unsaturated acid, e.g., acrylic, crotonic, undecylenic, propiolic, 2-butynoic, undecolic, cinnamic, dibasic unsaturated acids (which can be converted into water soluble, e.g., sodium, salts), e.g., maleic and citraconic, and the like, for acetic anhydride in the procedure of Preparation 2 is productive of the corresponding 2α-methyl-17α-hydroxy-4,9(11)-pregnadiene-3,20-dione 17-acylate, e.g., 2α-methyl-17α-hydroxy-4,9(11)-pregnadiene-3,20-dione 17-propionate, 2α-methyl-17α-hydroxy-4,9(11)-pregnadiene-3,20-dione 17-butyrate, 2α-methyl-17α-hydroxy-4,9(11)-pregnadiene-3,20-dione 17-caproate, 2α-methyl-17α-hydroxy-4,9(11)-pregnadiene-3,20-dione 17-(β-cyclopentylpropionate), 2α-methyl-17α-hydroxy-4,9(11)-pregnadiene-3,20-dione 17-phenylacetate and the like.

PREPARATION 3

2α-methyl-9α-bromo-11β,17α-dihydroxy-4-pregnene-3,20-dione 17-acetate

To a solution of 4.40 g. of 2α-methyl-17α-hydroxy-4,9(11)-pregnadiene-3,20-dione 17-acetate in 250 ml. of t-butyl alcohol and 50 ml. of methylene chloride was added a solution of 12.5 ml. of 70 percent perchloric acid in 87 ml. of water followed by a solution of 1.88 g. of N-bromoacetamide in 50 ml. of t-butyl alcohol. After stirring the reaction mixture for a period of about 15 minutes, a solution of 2.5 g. of sodium sulfite in 40 ml. of water was added and the reaction mixture was carefully concentrated to about 440 ml. under reduced pressure with no external heat. The concentrate was stirred and 500 ml. of water was added to give 5.80 g. of 2α-methyl-9α-bromo-11β,17α-dihydroxy-4-pregnene-3,20-dione 17-acetate as a yellow crystalline solid melting at 168–170° C. An analytical sample was prepared by recrystallizing 0.5 g. of the yellow crystalline solid from a mixture of methylene chloride and Skellysolve B hexanes to give 0.4 g. of 2α-methyl-9α-bromo-11β,17α-dihydroxy-4-pregnene-3,20-dione 17-acetate melting at 170–172° C. with decomposition.

Analysis.—Calcd. for $C_{24}H_{33}BrO_5$: Br, 16.60. Found: Br, 16.60.

In the same manner substituting another 2α-methyl-17α-hydroxy-4,9(11)-pregnadiene-3,20-dione 17-acylate wherein the acyl radical is that of an acid listed in Preparation 2, above, for 2α-methyl-17α-hydroxy-4,9(11)-pregnadiene-3,20-dione 17-acetate in the procedure of Preparation 3 is productive of the corresponding 2α-methyl-9α-bromo-11β,17α-dihydroxy-4-pregnene-3,20-dione 17-acylate, e.g., 2α-methyl-9α-bromo-11β,17α-dihydroxy-4-pregnene-3,20-dione 17-propionate, 2α-methyl-9α-bromo-11β,17α-dihydroxy-4-pregnene-3,20-dione 17-butyrate, 2α-methyl-9α-bromo-11β,17α-dihydroxy-4-pregnene-3,20-dione 17-caproate, 2α-methyl-9α-bromo-11β,17α-dihydroxy-4-pregnene-3,20-dione 17-(β-cyclopentylpropionate), 2α-methyl-9α-bromo-11β,17α-dihydroxy-4-pregnene-3,20-dione 17-phenylacetate, and the like.

EXAMPLE 1

2α-methyl-9β,11β-epoxy-17α-hydroxy-4-pregnene-3,20-dione 17-acetate

A solution of 390 mg. of 2α-methyl-9α-bromo-11β,17α-dihydroxy-4-pregnene-3,20-dione 17-acetate in 10 ml. of acetone was heated to reflux overnight with 400 mg. of potassium acetate. The suspension was then diluted with 15 ml. of water which dissolved the inorganic salts and precipitated the epoxide. The solid was collected on a filter, washed with water and air dried to give 270 mg. of 2α-methyl-9β,11β-epoxy-17α-hydroxy-4-pregnene-3,20-dione 17-acetate as fine needles melting at 214–218° C. with decomposition. A sample was recrystallized from acetone:Skellysolve B hexanes to give 2α-methyl-9β,11β-epoxy-17α-hydroxy-4-pregnene-3,20-dione 17-acetate melting at 220.0–224.0° C.;

$\lambda_{max}^{EtOH}$ 243 mμ (14,700), 292 mμ (128)

μ max. 1725, 1710, 1670, 1625, 1265, and 1220 cm.$^{-1}$.
Analysis.—Calcd. for $C_{24}H_{32}O_5$: C, 71.97; H, 8.05. Found: C, 71.87; H, 8.00.

In the same manner substituting another 2α-methyl-9α-bromo-11β,17α-dihydroxy-4-pregnene-3,20-dione 17-acylate wherein the acyl radical is that of an acid listed in Preparation 2 above for 2α-methyl-9α-bromo-11β,17α-dihydroxy-4-pregnene-3,20-dione 17-acetate in the procedure of Example 1 is productive of the corresponding 2α-methyl-9β,11β-epoxy-17α-hydroxy-4-pregnene-3,20-dione 17-acylate, e.g., 2α-methyl-9β,11β-epoxy-17α-hydroxy-4-pregnene-3,20-dione 17-propionate, 2α-methyl-9β,11β-epoxy-17α-hydroxy-4-pregnene-3,20-dione 17-butyrate, 2α-methyl-9β,11β-epoxy-17α-hydroxy-4-pregnene-3,20-dione 17-caproate, 2α-methyl-9β,11β-epoxy-17α-hydroxy-4-pregnene-3,20-dione 17-(β-cyclopentylpropionate), 2α-methyl-9β,11β - epoxy - 17α - hydroxy-4-pregnene-3,20-dione 17-phenylacetate and the like.

EXAMPLE 2

2α - methyl - 9α - fluoro - 11β,17α - dihydroxy - 4 - pregnene-3,20-dione 17-acetate A 200 mg. portion of 2α-methyl-9β,11β-epoxy-17α-hydroxy-4-pregnene-3,20-dione 17-acetate dissolved in 10 ml. of methylene chloride and 2 ml. of purified tetrahydrofuran was chilled to Dry-Ice temperature and added to a solution of 1 g. of liquid hydrogen fluoride in 5 ml. of methylene chloride. The reaction was allowed to proceed for a period of about 60 hours at 4° C. The reaction mixture was then poured into 40 ml. of dilute aqueous sodium bicarbonate solution and the product was extracted with methylene chloride. The methylene chloride extract was washed consecutively with dilute aqueous sodium bicarbonate solution, water and saturated aqueous sodium chloride solution and then dried over sodium sulfate. The dried methylene chloride solution thus obtained was absorbed onto a short column of Florisil synthetic magnesium silicate and eluted with 15 percent acetone in Skellysolve B hexanes to give a crystalline solid, which was recrystallized from acetone: Skellysolve B hexanes to give 90 mg. of 2α-methyl-9α-fluoro-11β,17α-dihydroxy-4-pregnene-3,20-dione 17-acetate melting at 218–200° C. An analytical sample was prepared by two recrystallizations from acetone:Skellysolve B hexanes to give 2α-methyl-9α-fluoro - 11β,17α - dihydroxy-4-pregnene-3,20-dione 17-acetate melting at 226.5°–228.0° C. with decomposition:

$\lambda_{max}^{EtOh}$ 237.5 mμ (15,900), flex 284 mμ (164)

υ max. 3440, 1727, 1708, 1666, 1631, 1267, 1250, and 1214 cm.$^{-1}$.

Analysis.—Calcd. for $C_{24}H_{35}O_5F$: C, 68.54; H, 7.91. Found: C, 68.58; H, 7.88.

In the same manner substituting another 2α-methyl-17α-hydroxy-9β,11β-epoxy-4-pregnene-3,20-dione 17-acylate wherein the acyl radical is that of an acid listed in Preparation 2 above, for 2α-methyl-17α-hydroxy-9β,11β-epoxy-4-pregnene-3,20-dione 17-acetate in the procedure of Example 2 is productive of the corresponding 2α-methyl - 9α-fluoro - 11β,17α-dihydroxy-4-pregnene-3,20-dione 17-acylate, e.g., 2α-methyl-9α-fluoro-11β,17α-dihydroxy-4-pregnene-3,20-dione 17-propionate, 2α - methyl-9α-fluoro - 11β,17α - dihydroxy-4-pregnene-3,20-dione 17-butyrate, 2α - methyl-9α-fluoro-11β,17α-dihydroxy - 4-pregnene-3,20-dione 17- caproate, 2α - methyl-9α-fluoro-11β,17α - dihydroxy-4-pregnene-3,20-dione 17-(β-cyclopentylpropionate), 2α - methyl-9α-fluoro - 11β,17α-dihydroxy-4-pregnene-3,20-dione 17 - phenylacetate and the like.

We claim:

1. 2α - methyl - 9α - fluoro-11β,17α-dihydroxy-4-pregnene-3,20-dione 17-acylate, wherein the acyl radical is that of a hydrocarbon carboxylic acid containing from 1 to 12 carbon atoms, inclusive.

2. 2α - methyl - 9α - fluoro - 11β,17α - dihydroxy - 4-pregnene-3,20-dione 17-acetate.

References Cited in the file of this patent

UNITED STATES PATENTS

| | | |
|---|---|---|
| 2,852,511 | Fried | Sept. 16, 1958 |
| 2,865,935 | Schmeider et al. | Dec. 23, 1958 |
| 2,892,851 | Bergstrom et al. | June 30, 1959 |